E. SCHMALZRIED.
ELASTIC COUPLING.
APPLICATION FILED SEPT. 8, 1908.
989,064.
Patented Apr. 11, 1911.
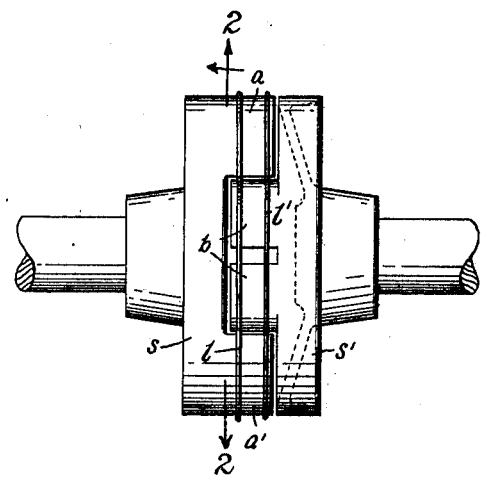
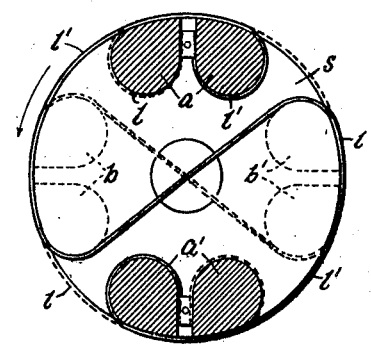

UNITED STATES PATENT OFFICE.

EUGEN SCHMALZRIED, OF FRANKFORT-ON-THE-MAIN, GERMANY, ASSIGNOR TO THE FIRM OF FELTEN & GUILLEAUME-LAHMEYERWERKE, ACTIEN-GESELLSCHAFT, OF FRANKFORT-ON-THE-MAIN, GERMANY.

ELASTIC COUPLING.

989,064.  Specification of Letters Patent.  Patented Apr. 11, 1911.

Application filed September 8, 1908. Serial No. 451,970.

*To all whom it may concern:*

Be it known that I, EUGEN SCHMALZRIED, a subject of the German Emperor, and a resident of Frankfort-on-the-Main, Germany, have invented a certain new and useful Elastic Coupling, of which the following is a specification.

My invention relates to improvements in elastic couplings and more particularly to that class of couplings in which each of the rotary members secured to the shafts to be coupled is provided with studs or pins about which a flexible connecting element, such as a rope, is passed in order to connect the said members.

The object of the improvements is to provide a coupling which is particularly elastic and in which both sections of the connecting element are subjected to the same strain when the members connected thereby are rotated. To accomplish this purpose the flexible connecting element is so arranged relative to the projecting studs of the coupling members that after being passed about studs on both coupling members it extends over a large chord and preferably along a diameter of one of the coupling members before it is again engaged with a second set of studs. Thereby the rope, which can freely slide over the said studs on one member of the coupling, will act, by its active length and its elasticity, as a cushion between the rotating parts, taking up shocks and insuring the smooth running of the driven part.

A further object of the improvements is to provide a coupling of the class described, which allows the shafts to be removed from their bearings without axial displacement of the same. For this purpose, the projections or studs provided on both clutch members are so arranged, relatively to each other, that the projections on one of said members can be radially passed between the projections of the other member.

For the purpose of explaining the invention, an embodiment thereof is shown in the accompanying drawing, in which—

Figure 1 is a side view of a coupling constructed in accordance with the invention; and Fig. 2 is a cross-section of Fig. 1, taken on the line 2—2.

In the coupling illustrated in the drawing, each member $s$ and $s'$ thereof is provided with two pairs of similar studs or projections, those on the member $s$ being designated as $a$ $a'$ and those on the member $s'$ as $b$ $b'$. To one of the projections $a$ is secured a flexible connecting element or rope $l$, which extends about the outer surface of the projections $a$ $a$, the outer surface of the pair of projections $b'$ $b'$ of the member $s'$ of the coupling, then across the space between the members $s$ $s'$ to the pair of projections $b$ $b$ on the same member, and then passes about the outer surfaces of the said projections $b$ $b$ and the projections $a'$ $a'$ of the member $s$ to one of the latter of which it is secured in any suitable way.

In the construction so far described, the coupling can be rotated in the direction of the arrow shown in Fig. 2, if the member $s$ is secured to the driving shaft, and will transmit such rotary movement to the shaft, connected with the coupling member $s'$. If it is desired to adapt the coupling for rotation in either direction a second flexible element or rope $l'$ is provided. In the example shown, the said rope $l'$ is likewise secured at both of its ends to the projections $a$ and $a'$ respectively, and it is successively wound about part of the circumferences of the projections $a$, $b$, $b'$ and $a'$, the loops provided thereby embracing the projections $b$ and $b'$ from sides opposite to those embraced by the rope $l$. The number of the projections $a$, $a'$, $b$, $b'$, and therefore the number of the windings of the rope depends on the frictional resistance desired between the rope sections and the projections and the strength of the said parts. If the axes of the revolving shafts are not in alinement with each other, the distance between two of the groups of projections connected by the same rope section is slightly decreased, while the distance between the other two groups of projections connected by another section of the same rope is slightly increased. This alteration of the distances between the said groups of projections, however, is equalized by one of the coupling members slightly falling behind the other one. Therefore, the coupling acts in a manner similar to a universal joint. During this operation no material axial forces are exerted on the shafts.

By arranging the several projections in the manner shown, that is so that those on one member of the coupling enter spaces between those on the other, and by making the spaces of such size that either coupling member can be moved radially of the other, the coupling can be easily assembled without variation between either member thereof and its connected shaft.

I claim:

In a power transmitting device, the combination with two rotating members, independently supported and located at a distance from each other in an axial direction, of alternately arranged pairs of projections provided on the adjacent faces of said members, successive pairs of projections on each of said members being spaced sufficiently to permit the projections on the other member to be shifted to and from operative relation to the other projections by a movement in a radial direction, and two flexible connecting elements each passed about successive projections on both members of the coupling and extending from a projection on one member to another and substantially diametrically opposite projection on the same member, the connecting elements being so arranged as to provide oppositely directed loops for the projections of each member of the coupling.

In testimony whereof I have signed my name to this specification in the presence of two subscribing witnesses.

EUGEN SCHMALZRIED.

Witnesses:
MICHAEL VOLK,
JEAN GRUND.

Copies of this patent may be obtained for five cents each, by addressing the "Commissioner of Patents, Washington, D. C."